Patented May 22, 1923.

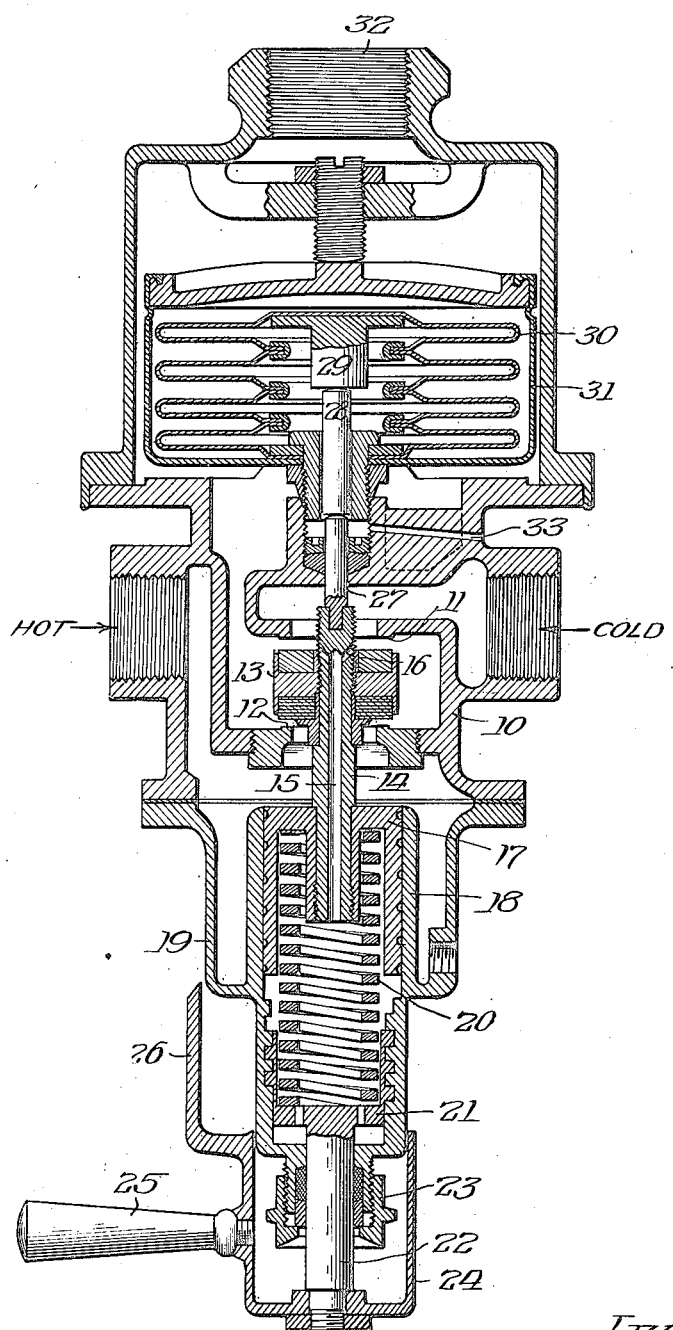

1,455,934

UNITED STATES PATENT OFFICE.

FRED W. POWERS AND MORTON O. SNEDIKER, OF CHICAGO, ILLINOIS, ASSIGNORS TO THE POWERS REGULATOR CO., OF CHICAGO, ILLINOIS, A CORPORATION OF ILLINOIS.

THERMOSTATIC WATER MIXER.

Application filed October 28, 1921. Serial No. 511,174.

*To all whom it may concern:*

Be it known that we, FRED W. POWERS and MORTON O. SNEDIKER, both citizens of the United States and residents of Chicago, in the county of Cook and State of Illinois, have invented certain new and useful Improvements in a Thermostatic Water Mixer, of which the following is a specification.

Our invention relates to thermostatically controlled water mixers and particularly to a novel construction adapted to equalize and compensate for variations in pressures of the two fluids to be mixed.

It is common to employ controllers of different forms for showers and other similar uses in order that water of a predetermined temperature may be supplied at all times. Difficulty has been experienced, however, in maintaining such constant temperatures in view of unavoidable variations in the entrance pressures of the hot and cold fluids to be mixed, and to that end different forms of reducing valves have been applied to the supply lines.

One of the objects of this invention is to provide a self-contained regulating unit in which variations in the entrance pressures of the respective fluids are caused to instantly effect an adjustment of the valve which controls the admission thereof to the mixing chamber in advance of possible readjustment by the thermostatic element. In our construction we provide in connection with the thermostatically operated valve a piston which is connected to the valve stem, one side of the piston being exposed to the entrance pressure of the cold liquid and the other side of the piston to the entrance pressure of the heated fluid. The piston is associated with the manually controlled regulating apparatus and forms an inconspicuous part of the regulating unit.

The invention will be more readily understood by reference to the accompanying drawing in which the figure is a vertical sectional view through a regulator constructed in accordance with out invention.

In the drawings it will be seen that we provide a valve casing 10, having seats 11, 12, surrounding the cold and hot fluid inlet ports respectively. These ports are controlled by a single valve 13, carried by a stem 14, a portion of which stem has an axial opening 15 which, in connection with the lateral passages 16, provides a conduit for liquid entering through the cold water port to the bottom side of the piston 17, which is secured to the lower extremity of the stem 14. The piston is guided within cylindrical walls 18, formed as a part of the casting 19, secured to the casing 10. The upper surface of the piston 17 is exposed to the entrance pressure of the hot fluid and and the lower surface, as stated, is exposed to the pressure of the cold liquid. A compression spring 20, bears against the under surface of the piston and rests within a threaded sleeve 21, to which a stem 22 is attached. The stem is packed by means of the usual gland nut 23, and is secured at its lower end to a part 24, having a handle 25 connected thereto. A pointer 26 may be associated with the movable part and may be correlated with temperature indications disposed on the outer surface of the casting 19.

At its upper end the stem 14 has connected thereto a short section 27, which abuts a plunger 28, the upper end of which is in contact with a projection 29, from the inner wall of a bellows 30. The bellows is contained within a rigid casing 31, and thermostatic liquid is within the casing and surrounds the bellows. Thus the bellows is not subject to the external pressure of the fluid which passes therearound. The mixed fluids, after passing the valve 13, are directed upwardly around the casing 31 and out through the port 32. The section 27, of the stem is packed to provide a fluid-tight joint, and a vent opening 33, serves to place the space above the packing in communication with the atmosphere. Thus any liquid which escapes around the stem will be discharged through the vent opening and none of it will enter the bellows.

In operation, the device being suitably connected to a source of hot and cold fluids, and the spring 20 being properly compressed in order to counteract the expansive force exerted by the thermostatic liquid, the device will continue to function in the required manner.

Whenever any variation occurs in the entrance pressures of the respective fluids, the variation is instantly effective on one or the other of the ends of the piston, thus unbalancing the same and causing movement of the valve to restrict the size of the entrance opening for the fluid in which the increase of pressure has taken place. Consequently all dis-